3,154,399
SYNERGISTIC HERBICIDAL COMPOSITION AND METHOD EMPLOYING A TRICHLOROBENZYL-OXYALKANOL AND A CHLORINATED ALIPHATIC ACID OR ESTER THEREOF
Edward D. Weil, Lewiston, Jerome Linder, Niagara Falls, Edwin Dorfman, Grand Island, and Jack S. Newcomer, Wilson, N.Y., assignors to Hooker Chemical Corporation, Niagara Falls, N.Y., a corporation of New York
No Drawing. Filed Aug. 4, 1961, Ser. No. 129,224
16 Claims. (Cl. 71—2.7)

This application is a continuation-in-part of S.N. 791,015, filed February 4, 1959, now U.S. 3,006,967, and S.N. 102,099, filed April 11, 1961, in the United States Patent Office.

This invention describes novel synergistic herbicidal compositions whose total herbicidal effect is significantly greater than the additive effect of the individual components particularly on recalcitrant broadleaf weeds.

More specifically, this invention relates to two-component herbicidal mixtures offering superior herbicidal activity on broadleaf and to some extent narrowleaf weeds that could not be predicted on the basis of the herbicidal behavior of the individual components acting alone. For the sake of simplicity the components of these mixtures will be hereafter referred to as Group A and Group B.

The Group A components selected from trichlorobenzyloxyalkanols of the structure:

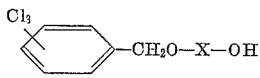

wherein X is an organic radical chosen from the group consisting of alkylene, alkyleneoxyalkylene and hydroxyalkylene radicals having from two to six carbon atoms inclusive. The preparation of the above compounds is given in detail in the parent case S.N. 791,015, now U.S. 3,006,967.

The Group B components are chosen from a group of known chlorinated aliphatic acids and esters consisting of trichloroacetic acid, 2,2-dichloropropionic acid, 2,2,3-trichloropropionic acid and the salts and esters of these acids. The free acids and some of their salts and esters are available by chlorination of acetic and propionic acids by known processes. The esters and salts can be made starting with the free acids by well known synthetic procedures, for example, the esterification may be conducted as in United States Patent 2,634,290. Examples of salts intended to be within this inventive concept include but are not limited to the alkali metal, the alkaline earth metal, the heavy metal salts as well as the ammonium and substituted ammonium salts including the mono-, di-, and trialkylammonium, mono-, bis-, and tris(hydroxyalkyl) ammonium, and hydroxylammonium salts. Examples of esters are the alkyl esters including methyl, ethyl, propyl, isopropyl, butyl, isobutyl, amyl, isoamyl, 1,2-ethylene, 1,2-propylene, glyceryl, sorbityl, pentaerythritol and the like, aryl esters, such as phenyl esters, chlorinated aryl esters including but not limited to the pentachlorophenyl esters and the esters of the acids of Group B with the trichlorobenzyloxyalkanols of Group A.

While the synergism between the A and B components is manifested at wide ratios of A to B, the synergistic effect is observed to be economically significant between the ratio range of about one part by weight of A to one-quarter part to forty parts by weight of B.

All of the above-named and indicated A and B components are effective synergistic herbicidal mixtures. However, superior and preferred group of synergistic compositions of this invention particularly from the viewpoint of relatively higher phytotoxicity and relatively lower cost comprise either trichlorobenzyloxyethanol or propanol as the A component combined with either sodium trichloroacetate, ethylene glycol bis(trichloroacetate) or propylene glycol bis(trichloroacetate) as the B component in the ratio of about one part by weight of A to one-half to twenty parts by weight of B. Furthermore, because of their high activity and the relative ease of their preparation, it is preferred to employ, as the composition of Group A, isomeric mixtures containing among other isomers at least thirty percent of the 2,3,6-trichlorobenzyloxyalkanol isomer.

Thus, the preferred embodiment of this invention from all aspects is a mixture made up of one part by weight of component A comprising at thirty percent of the 2,3,6-trichlorobenzyloxyethanol or 2,3,6 - trichlorobenzyloxypropanol (the remainder of A being other isomers of the respective trichlorobenzyloxyalkanol) combined with from about one-half to twenty parts by weight of component B wherein B is chosen from the group consisting of sodium trichloroacetate, ethylene glycol bis(trichloroacetate) and propylene glycol bis(trichloroacetate).

Frequently, in land of marginal or low economic value there is a need for low cost persistent broad spectrum herbicides to control, restrict or sterilize plant growth particularly the aggressive and resistant broadleaf weeds such as perennial vines, grasses and brush. For example, along railroad rights of way, roadsides, ditchbanks, power line rights of way, non-paved parking areas and the like, freedom from weed growth is essential, yet hand or mechanical weeding is prohibitively expensive. The use of herbicides has been limited by the fact that the known herbicides have lacked long persistence as well as broad-spectrum phytotoxicity against both narrowleaf (monocotyledonous) and broadleaf (dicotyledonous) weeds, especially perennials. For example, 2,4-D and 2,4,5-T are ineffectual against grasses and many perennial broadleaf weeds, and also are short-lived in the soil, while trichloroacetic acid, 2,2-dichloropropionic acid, 2,2,3-trichloropropionic acid, and their esters and salts are nearly ineffectual against broadleaf weeds. Herbicidal petroleum oils while low in cost and effective against the more vulnerable annual grasses and broadleaf weeds are ineffective against perennial weeds such as bindweed whose root systems are extensive enough to allow for regrowth when the above-ground portion of the plants are killed. A general shortcoming of these herbicides and many of the other commercially available herbicides is unduly rapid dissipation of their phytotoxicity after application, making necessary expensive follow-up or repeat applications.

Individually the "A" group components of this invention while satisfactory on broadleaf weeds at higher rates of application, tend to be much less satisfactory when used on the perennial narrowleaf weeds or grasses. Also, as the rate of application is lowered below about ten pounds per acre, the "A" compounds become insufficiently active on the broadleaf weeds and become essentially inactive on perennial grassy weeds.

Thus, because of the insufficiency of the components of the "A" and "B" groups individually particularly on broadleaf weeds, it was most surprising and unexpected to find that the addition of "B" to "A" overcame the following insufficiencies of the individual components by far more than can be accounted for in a purely additive fashion.

The inventive "A–B" compositions as might be expected afford a high degree of control of grassy or narrowleaf weeds largely because of the known high phytotoxicity of the "B" component on grassy weeds. However, it is interesting to note particularly in those compositions where "A" rather than "B" predominates, this control of the grassy weeds is maintained in spite of the fact that the lower rate of "B" individually affords only moderate control and "A" individually gives no control. Thus, here also a substantial degree of synergism is clearly established.

However, the major showing of synergism by the compositions of this invention is on the broadleaf weeds, especially broadleaf perennial weeds. Here, particularly at lower rates of application, where "A" individually shows only weak or marginal control of broadleaf weeds, and "B" no activity whatsoever, the combination of these individually non-phytotoxic quantities of "A" and "B" results in a highly phytotoxic composition affording substantial control of broadleaf weeds and perennial grasses. It is therefore an object and advantage of this invention to afford a low cost, persistent, broad spectrum herbicide combination which has greater herbicidal activity on weeds particularly broadleafs than can be obtained using the same amount of the individual components alone.

It follows therefore, that a further object and advantage of this invention is a herbicidal method to utilize the above novel synergistic compositions.

The preferred method of utilizing the mixtures of this invention is to apply the "A" or "B" components simultaneously or in close succession to the weed populace. In order to apply the chemicals simultaneously, it is necessary to find a compatible formulation. The compounds of "A" are oil-soluble rather than water-soluble, while the "B" group solubilities depend upon whether salts or acids or esters are used. The salts generally are water soluble and thus would be incompatible with the oil soluble "A" compositions, unless they are emulsified, dispersed or suspended in a compatible formulation containing the necessary diluents, surface active agents, emulsifiers, wetting agents or the like. These conditioning materials are hereintofore referred to as adjuvants and a lengthy but not complete listing of them appears in "Soap and Chemical Specialities," vol. 31, No. 7, pages 50 to 61; No. 8, pages 48 to 61; No. 9, pages 52 to 67 and No. 10, pages 38 to 67 (1955). Other suitable adjuvant materials are set forth in Bulletin E–607 of the Bureau of Entomology and Plant Quarantine of the United States Department of Agriculture.

The combinations of the "A" and "B" components are formulated and applied in three principle ways: (1) as oil-miscible solutions where for example, both the "A" and "B" components are oil soluble. An example of one such composition would be trichlorobenzyloxyethanol or propanol ("A") plus ethylene glycol bis(trichloroacetate) ("B") in an oil such as petroleum oil to be sprayed as is or after further dilution with oil; (2) as water-emulsifiable solutions in organic solvents such as petroleum hydrocarbon plus an emulsifying agent such as an alkylarylsulfonate salt and/or a polyoxyethylene ether; an example of this type of formulation would be trichlorobenzyloxyethanol or propanol ("A") plus ethylene glycol bis(trichloroacetate) ("B") in petroleum oil, xylene or high aromatic naphtha plus an emulsifier, this composition is emulsified with water and applied by spraying; (3) as solid granules, pelleted, wettable powder or dust formulation diluted or supported on solid carriers such as talcs, clays, flours, ground corn cobs, starches, vermiculite, diatomaceous earths, mica, alkaline earth limes, carbonates and phosphates. An example of this would be trichlorobenzyloxyethanol or propanol ("A") plus sodium trichloroacetate ("B") absorbed on clay granules to be manually or mechanically broadcast. Alternatively, adjuvants such as wetting agents or dispersing agents may be added to such a mixture, which should be pulverized to a fine state of division, and the composition then dispersed in water and applied as a spray.

Other pesticides and biotoxicants including herbicides, fungicides and insecticides may be combined with the novel compositions of this invention. Particularly in the case of herbicides, these compounds may have complementary additive or even further synergistic effects. Examples of these herbicides are 2,4-D and 2,4,5-T salts and esters, herbicidal metallic chlorates, alkali or alkaline earth borates, herbicidal N,N-dialkyl-N-phenyl- and N-chlorinated phenyl-ureas, herbicidal triazines, polychlorobenzoic acids and amides, alkali and alkaline earth arsenates and arsenites, cacodylic acid, phytotoxic mineral oils, hexachlorocyclopentadiene, hexachlorocyclopentenone, pentachlorophenol and its salts, dinitro-alkyl-phenols, hexachloroacetone and the like. Examples of fungicides which may be employed include but are not limited to sulfur, the metal dimethyldithiocarbamates and alkylene bis(dithiocarbamates). Insecticides which may be used include the insecticidal carbamates, DDT, chlordane, benzene hexachloride, etc.

While the manner and method of application of the inventive compositions varies and is somewhat dependent upon the soil structure, the weed population, the stage of growth and the like, the following generalizations may be made:

The herbicidal composition with or without adjuvants is applied as a spray or broadcast on to the weed population onto the area in which weed growth is to be deterred. Low rates such as about one to ten pounds per acre are suitable where the weed population is mainly composed of the more vulnerable annual weeds. Where these low rates are employed, the compositions can be used as selective herbicides and discrimination is possible in crops such as sugar cane, corn, and certain turf grasses. At higher rates ranging from about ten to about one hundred pounds per acre good control of mixed populations is accomplished. Rates above this figure (one hundred pounds per acre) are utilized where long term sterilization (several years) is desired or where only very small areas such as strips of soil abutting highways, railroads, signs, signals, etc. are to be treated and where difficult accessibility and high labor cost are dominant factors.

The examples which follow are intended to further illustrate the workings of this invention and in no manner are to be construed as limiting the invention except as set forth in the claims and specification.

*Example 1*

This example shows the preparation and analysis of the Group A alcohol component of the synergistic herbicidal composition of this invention; the members of the X group in the above-shown general formula are indicated in the first column of the chart below.

Toluene was chlorinated at sixty to seventy degrees centigrade in the presence of 0.1 percent ferric chloride as a catalyst until the weight uptake indicated about 2.5 moles of chlorine had reacted. The product was distilled and the fraction boiling one hundred and twenty to one hundred and forty degrees centigrade (twenty mm.), was taken. Analysis by infrared indicated an isomer content of twenty-five to forty percent 2,4,5-, forty to fifty percent 2,3,6-, and ten to fifteen percent 2,3,4-trichlorotoluene. This trichlorotoluene was chlorinated at one hundred to two hundred degrees centigrade under irradiation by a mercury vapor lamp until 0.7 to 0.8 mole of hydrogen chloride per mole of trichlorotoluene was evolved. This product was fractionated to obtain the trichlorobenzyl chloride fraction, boiling point one hundred and thirty-one to one hundred and fifty-two degrees centigrade (six mm.). This trichlorobenzyl chloride was added with stirring to 1.5 molar equivalents of caustic soda in a molar excess of the chosen glycol, at one hundred and forty to one hundred and fifty degrees centigrade, and the reaction mixture heated and stirred for about three hours. The mixture was then poured into water, exhaustively extracted with toluene, and the toluene extracts combined and distilled under reduced pressure to obtain the desired product. Infrared analysis shows these products to have substantially the same isomer distribution as the trichlorotoluene intermediate.

area was divided into plots and sprayed in early spring with various chemicals and combinations thereof. One year later, the plots were inspected after weed growth

| Composition Number | Group —X— | Glycol Employed | Description of Product | Analysis Cl Calcd. | Cl Found |
|---|---|---|---|---|---|
| 1 | —CH₂CH₂— | Ethylene glycol | Semi-solid b.p. 181–192° C. (6 mm.) | 41.6 | 41.2 |
| 2 | —CH₂CH₂CH₂CH₂— | 1,4-butanediol | Viscous syrup b.p. 140–168° C. (0.25 mm.) | 37.6 | 37.3 |
| 3 | —CH₂CH(CH₃)— | 1,2-propanediol | Viscous syrup b.p. 140–168° C. (0.5 mm.) | 39.5 | 37.9 |
| 4 | —CH₂CHOHCH₂— | Glycerol | Very viscous syrup decomp. on dist | 37.5 | 39.3 |
| 5 | —CH₂CH₂OCH₂CH₂— | Diethylene glycol | Viscous syrup, b.p. 175–185° C. (0.05 mm.) | 35.5 | 34.0 |
| 6 | —CHCH(CH₃)OCH₂CH(CH₃)— | Dipropylene glycol | Viscous syrup, b.p. 180–185° C. (0.05 mm.) | 32.5 | 32.7 |
| 7 | —CH(CH₃)CHCH(CH₃)— | 2,3-butanediol | Viscous syrup, b.p. 170–176° C. (5 mm.) | 37.7 | 37.8 |
| 8 | —CH₂CH₂CH(CH₃)— | 1,3-butanediol | Viscous syrup, b.p. 171–182° C. (5 mm.) | 37.7 | 37.3 |
| 9 | —(CH₂CH₂O)₂CH₂CH₂— | Triethylene glycol | Viscous syrup, b.p. 210–250° C.(0.38 mm.) | 31.0 | 28.8 |
| 10 | —CH₂CH₂—* | Ethylene glycol | Semi solid b.p. 175–190° C. (5 mm.) | 41.6 | 41.0 |
| 11 | —CH₂CH(CH₃)—* | 1,2-propane diol | Viscous semi-solid b.p. 145–160° C. (0.5 mm.) | 39.5 | 39.0 |

*As composition 1 or 3 but prepared from orthochlorotoluene (infrared analysis shows sixty to seventy percent 2,3,6-isomer and thirty to forty percent 2,4,5-isomer in the final product.

*Example 2*

The area employed for these tests was infested with a heavy mixed population of broadleaf perennial weeds, including bindweed, plantain, and Canada thistle as major species, and also with a mixed population of perennial grasses of which quackgrass was predominant. The test area was divided into plots and sprayed in early spring with various chemicals and combinations thereof. One year later, the plots were inspected after weed growth was well under way, and the percent repression of weed population in the various test plots relative to untreated control plots was estimated.

| Chemical (Rate in Pounds Per Acre is Given in Parenthesis) | Percent Reduction in Weed Population, Estimated Relatives to Control | | | | | |
|---|---|---|---|---|---|---|
| | Broadleaf Weeds | | | | Grassy Weeds | |
| | Bindweed | Plantain | Thistle | All Broadleafs | Quackgrass | All Grasses |
| 2,3,6-Trichlorobenzyloxyethanol (5) | 5 | 20 | 5 | 10 | 0 | 0 |
| 2,3,6-Trichlorobenzyloxyethanol (10) | 10 | 40 | 20 | 30 | 0 | 0 |
| 2,3,6-Trichlorobenzyloxyethanol (40) | 100 | 80 | 50 | 65 | 40 | 40 |
| 2,3,6-Trichlorobenzyloxypropanol (5) | 5 | 30 | 20 | 20 | 0 | 0 |
| 2,3,6-Trichlorobenzyloxypropanol (10) | 10 | 50 | 30 | 35 | 5 | 5 |
| 2,3,6-Trichlorobenzyloxypropanol (20) | 100 | 100 | 70 | 80 | 70 | 70 |
| Sodium trichloroacetate (20) | 0 | 0 | 0 | 0 | 30 | 30 |
| Sodium trichloroacetate (40) | 0 | 0 | 0 | 0 | 90 | 90 |
| Sodium 2,2-dichloropropionate (10) | 0 | 0 | 0 | 0 | 50 | 50 |
| Sodium 2,2-dichloropropionate (20) | 0 | 0 | 0 | 0 | 100 | 100 |
| Ethylene glycol bis(trichloroacetate) (20) | 0 | 0 | 0 | 0 | 50 | 30 |
| Ethylene glycol bis(trichloroacetate) (40) | 0 | 0 | 0 | 0 | 100 | 100 |
| Propylene glycol bis(trichloroacetate) (40) | 0 | 0 | 0 | 0 | 100 | 100 |
| Propylene glycol bis(trichloroacetate) (100) | 0 | 0-20 | 0 | 0-5 | 100 | 100 |
| 2,3,6-Trichlorobenzyloxyethanol (10) plus Ethylene glycol bis(trichloroacetate) (40) | 60 | 100 | 90 | 80 | 100 | 100 |
| 2,3,6-Trichlorobenzyloxyethanol (40) plus Ethylene glycol bis(trichloroacetate) (20) | 100 | 100 | 90 | 95 | 100 | 100 |
| 2,3,6-Trichlorobenzyloxypropanol (5) plus Ethylene glycol bis(trichloroacetate) (20) | 40 | 60 | 40 | 50 | 30 | 80 |
| 2,3,6-Trichlorobenzyloxypropanol (5) plus Ethylene glycol bis(trichloroacetate) (40) | 45 | 65 | 50 | 55 | 100 | 100 |
| 2,3,6-Trichlorobenzyloxypropanol (10) plus Ethylene glycol bis(trichloroacetate) (20) | 100 | 100 | 100 | 100 | 100 | 100 |
| 2,3,6-Trichlorobenzyloxypropanol (5) plus Sodium trichloroacetate (40) | 20 | 65 | 40 | 50 | 100 | 100 |
| 2,3,6-Trichlorobenzyloxypropanol (10) plus Sodium trichloroacetate (20) | 70 | 90 | 70 | 80 | 60 | 60 |
| 2,3,6-Trichlorobenzyloxypropanol (20) plus Sodium trichloroacetate (20) | 100 | 100 | 100 | 100 | 100 | 100 |
| 2,3,6-Trichlorobenzyloxypropanol (5) plus Sodium 2,2-dichloropropionate (10) | 40 | 60 | 40 | 50 | 100 | 100 |
| 2,3,6-Trichlorobenzyloxypropanol (10) plus Sodium 2,2-dichloropropionate (20) | 90 | 100 | 50 | 95 | 100 | 100 |
| 2,3,6-Trichlorobenzyloxypropanol (5) plus Propylene glycol bis(trichloroacetate) (100) | 50 | 60 | 60 | 55 | 100 | 100 |
| 2,3,6-Trichlorobenzyloxypropanol (10) plus Propylene glycol bis(trichloroacetate) (40) | 90 | 100 | 90 | 95 | 100 | 100 |

Essentially similar results are obtained by substituting isomer mixtures of approximately seventy percent 2, 3, 6-, and approximately thirty percent 2, 4, 5-trichlorobenzyloxyalkanols, made analogously to Example 1, compound 10, in place of the 2, 3, 6-isomers listed above.

*Example 3*

Plots were sprayed in the same area as in the preceding example using other chemicals and combinations thereof as shown. After one year, the estimated percent repression of weed population relative to untreated control plots was as shown in the table.

| Chemical (Rate in Pounds Per Acre is Given in Parenthesis) | Percent Reduction in Weed Population, Estimated Relatives to Control ||||||
|---|---|---|---|---|---|---|
| | Broadleaf Weeds |||| Grassy Weeds ||
| | Bindweed | Plantain | Thistle | All Broadleafs | Quackgrass | All Grasses |
| Trichlorobenzyloxyethanol[1](10) | 10 | 25 | 15 | 15 | 0 | 0 |
| Trichlorobenzyloxyethanol[1](20) | 25 | 60 | 40 | 40 | 0 | 0 |
| Trichlorobenzyloxyethanol[1](40) | 90 | 70 | 50 | 65 | 25 | 25 |
| Trichlorobenzyloxypropanol[2](10) | 10 | 40 | 25 | 25 | 0 | 0 |
| Trichlorobenzyloxypropanol[2](20) | 25 | 70 | 40 | 50 | 10 | 10 |
| Trichlorobenzyloxypropanol[2](40) | 80 | 100 | 100 | 90 | 85 | 85 |
| Sodium trichloroacetate(20) | 0 | 0 | 0 | 0 | 30 | 30 |
| Sodium trichloroacetate(40) | 0 | 0 | 0 | 0 | 90 | 90 |
| Sodium trichloroacetate(10) | 0 | 0 | 0 | 0 | 50 | 50 |
| Sodium trichloroacetate(20) | 0 | 0 | 0 | 0 | 100 | 100 |
| Ethylene glycol bis(trichloroacetate)(20) | 0 | 0 | 0 | 0 | 50 | 50 |
| Ethylene glycol bis(trichloroacetate)(40) | 0 | 0 | 0 | 0 | 100 | 100 |
| Propylene glycol bis(trichloroacetate)(40) | 0 | 0 | 0 | 0 | 100 | 100 |
| Propylene glycol bis(trichloroacetate) (100) ethanol | 0 | 0–20 | 0 | 0–5 | 100 | 100 |
| Trichlorobenzyloxyethanol[1] (20) plus ethylene glycol bis(trichloroacetate) (40) | 65 | 100 | 95 | 85 | 100 | 100 |
| Trichlorobenzyloxyethanol[1] (40) plus ethylene glycol bis(trichloroacetate) (20) | 100 | 100 | 100 | 100 | 100 | 100 |
| Trichlorobenzyloxypropanol[2] (10) plus Ethylene glycol bis(trichloroacetate)(20) | 60 | 65 | 45 | 60 | 80 | 20 |
| Trichlorobenzyloxypropanol[2] (10) plus Ethylene glycol bis(trichloroacetate)(40) | 65 | 70 | 55 | 65 | 100 | 100 |
| Trichlorobenzyloxypropanol[2] (40) plus Ethylene glycol bis(trichloroacetate) (20) | 100 | 100 | 100 | 100 | 100 | 100 |
| Trichlorobenzyloxypropanol[2] (10) plus Sodium trichloroacetate(40) | 40 | 80 | 60 | 60 | 100 | 100 |
| Trichlorobenzyloxypropanol[2] (20) plus Sodium trichloroacetate(20) | 75 | 100 | 75 | 85 | 100 | 100 |
| Trichlorobenzyloxypropanol[2] (40) plus Sodium trichloroacetate(20) | 100 | 100 | 100 | 100 | 100 | 100 |
| Trichlorobenzyloxypropanol[2] (10) plus Sodium 2,2-dichloropropionate(20) | 45 | 80 | 40 | 60 | 70 | 70 |
| Trichlorobenzyloxypropanol[2] (20) plus Sodium 2,2-dichloropropionate(20) | 100 | 100 | 95 | 95–100 | 100 | 100 |
| Trichlorobenzyloxypropanol[2] (10) plus Propylene glycol bis(trichloroacetate) (100) | 55 | 65 | 80 | 65 | 100 | 100 |
| Trichlorobenzyloxypropanol[2] (20) plus propylene glycol bis(trichloroacetate) (40) | 100 | 100 | 100 | 100 | 100 | 100 |

[1] Isomer mixture having the composition described in Example 1, compound 1.
[2] Isomer mixture having the composition described in Example 1, compound 3.

We claim:

1. A herbicidal composition comprising one part by weight of a trichlorobenzyloxyalkanol of the structure:

$$Cl_3\text{-}C_6H_3\text{-}CH_2O\text{-}X\text{-}OH$$

wherein X is an organic radical selected from the group consisting of alkylene, alkylene-oxy-alkylene and hydroxyalkylene, having from two to six carbon atoms; combined with from one-quarter part to forty parts by weight of a chlorinated aliphatic compound selected from the group consisting of trichloroacetic acid, 2,2-dichloropropionic acid, 2,2,3-trichloropropionic acid, the alkali, alkaline earth, ammonium salts, alkylammonium salts and hydroxyalkylammonium salts of trichloroacetic acid, 2,2-dichloroproponic acid and 2,2,3-trichloropropionic acid, and the aliphatic, aromatic and chlorinated aromatic esters of tricholoracetic acid, 2,2-dichloropropionic acid and 2,2,3-trichloropropionic acids.

2. The herbicidal composition of claim 1 in admixture with at least one conditioning adjuvant chosen from the group consisting of solvents, surface active agents, solid carriers and diluents.

3. The herbicidal composition of claim 1 wherein the trichlorobenzyloxyalkanol is trichlorobenzyloxyethanol and the chlorinated aliphatic compound is ethylene glycol bis(trichloroacetate).

4. The herbicidal composition of claim 1 wherein the trichlorobenzyloxyalkanol is trichlorobenzyloxypropanol and the chlorinated aliphatic compound is ethylene glycol bis(trichloroacetate).

5. The herbicidal composition of claim 1 wherein the trichlorobenzyloxyalkanol is 2,3,6 - trichlorobenzyloxypropanol and the chlorinated aliphatic compound is ethylene glycol bis(trichloroacetate).

6. The herbicidal composition of claim 1 wherein the trichlorobenzyloxyalkanol is trichlorobenzyloxyethanol and the chlorinated aliphatic compound is propylene glycol bis(trichloroacetate).

7. The herbicidal composition of claim 1 wherein the trichlorobenzyloxyalkanol is 2,3,6-trichlorobenzyloxyethanol and the chlorinated aliphatic compound is ethylene glycol bis(trichloroacetate).

8. The herbicidal composition of claim 1 wherein the trichlorobenzyloxyalkanol is 2,3,6-trichlorobenzyloxypropanol and the chlorinated aliphatic compound is propylene glycol bis(trichloroacetate).

9. The herbicidal composition of claim 1 wherein the trichlorobenzyloxyalkanol is 2,3,6-trichlorobenzyloxypropanol and the chlorinated aliphatic compound is sodium trichloroacetate.

10. The herbicidal composition of claim 1 wherein the trichlorobenzyloxyalkanol is 2,3,6-trichlorobenzyloxyethanol and the chlorinated aliphatic compound is sodium trichloroacetate.

11. The herbicidal composition of claim 1 wherein the trichlorobenzyloxyalkanol is 2,3,6-trichlorobenzyloxyethanol and the chlorinated aliphatic compound is sodium 2,2-dichloropropionate.

12. The herbicidal composition of claim 1 wherein the trichlorobenzyloxyalkanol is 2,3,6-trichlorobenzyloxypropanol and the chlorinated aliphatic compound is sodium 2,2-dichloropropionate.

13. A method for controlling weeds which comprises applying to the locus to be treated a phytotoxic amount of a composition comprising from one to ten parts by weight of a trichlorobenzyloxyalkanol of the structure:

$$Cl_3\text{-}C_6H_3\text{-}CH_2O\text{-}X\text{-}OH$$

wherein X is an organic radical selected from the group consisting of alkylene, alkylene-oxyalkylene and hydroxyalkylene having from two to six carbon atoms; combined with one to fifty parts by weight of a chlorinated aliphatic compound selected from the group consisting of trichloroacetic acid, 2,2-dichloropropionic acid, 2,2,3-trichloropropionic acid, the alkali, alkaline earth, ammonium salts, alkylammonium salts, hydroxyalkylammonium salts of trichloroacetic acid, 2,2-dichloropropionic acid and 2,2,3-trichloropropionic acid, and the aliphatic, aromatic and chlorinated aromatic esters of trichloroacetic acid, 2,2-dichloropropionic acid and 2,2,3-trichloropropionic acids.

14. The method of claim 13 wherein the composition applied consists of trichlorobenzyloxyethanol and ethylene glycol bis(trichloroacetate).

15. The method of claim 13 wherein the composition applied consists of trichlorobenzyloxypropanol and ethylene glycol bis(trichloroacetate).

16. The method of claim 13 wherein the composition applied consists of trichlorobenzyloxyethanol and propylene glycol bis(trichloroacetate).

References Cited in the file of this patent

UNITED STATES PATENTS

| | | |
|---|---|---|
| 2,393,086 | Bousquet | Jan. 15, 1946 |
| 2,622,974 | Swezey | Dec. 23, 1952 |
| 2,634,290 | Sonia et al. | Apr. 7, 1953 |
| 2,642,354 | Barrons | June 16, 1953 |
| 2,734,075 | Brust et al. | Feb. 7, 1956 |
| 3,006,967 | Newcomer et al. | Oct. 31, 1961 |

OTHER REFERENCES

Meadows: "Proceedings, Northeastern Weed Control Conference," January 1960, pages 3 to 6 (page 4 of special interest). P.O. Library.